W. E. NICKERSON.
AUTOMATIC WEIGHING APPARATUS.
APPLICATION FILED NOV. 25, 1901.

936,557.

Patented Oct. 12, 1909.
6 SHEETS—SHEET 1.

Fig. 1.

W. E. NICKERSON.
AUTOMATIC WEIGHING APPARATUS.
APPLICATION FILED NOV. 25, 1901.

936,557.

Patented Oct. 12, 1909.
6 SHEETS—SHEET 2.

Fig. 2.

W. E. NICKERSON.
AUTOMATIC WEIGHING APPARATUS.
APPLICATION FILED NOV. 25, 1901.

936,557.

Patented Oct. 12, 1909.
6 SHEETS—SHEET 4.

Fig. 7

WITNESSES:

INVENTOR:
W. E. Nickerson,
by E. D. Chadwick,
Attorney.

W. E. NICKERSON.
AUTOMATIC WEIGHING APPARATUS.
APPLICATION FILED NOV. 25, 1901.

936,557.

Patented Oct. 12, 1909.
6 SHEETS—SHEET 5.

Witnesses:
Joseph T. Brennan
Margaret A. Danihur

Inventor:
W. E. Nickerson,
by E. D. Chadwick,
Attorney

W. E. NICKERSON.
AUTOMATIC WEIGHING APPARATUS.
APPLICATION FILED NOV. 25, 1901.

936,557.

Patented Oct. 12, 1909.
6 SHEETS—SHEET 6.

FIG. 11.

WITNESSES:

INVENTOR:
W. E. Nickerson,
by E. D. Chadwick,
Attorney

UNITED STATES PATENT OFFICE.

WILLIAM EMERY NICKERSON, OF CAMBRIDGE, MASSACHUSETTS, ASSIGNOR, BY MESNE ASSIGNMENTS, TO AUTOMATIC WEIGHING MACHINE COMPANY, OF NEW YORK, N. Y., A CORPORATION OF NEW YORK.

AUTOMATIC WEIGHING APPARATUS.

936,557.  Specification of Letters Patent.  Patented Oct. 12, 1909.

Application filed November 25, 1901. Serial No. 83,568.

*To all whom it may concern:*

Be it known that I, WILLIAM E. NICKERSON, a citizen of the United States, residing at Cambridge, in the county of Middlesex and State of Massachusetts, have invented certain new and useful Improvements in Automatic Weighing Apparatus, of which the following is a specification.

In Letters Patent of the United States No. 797,144 and No. 797,145, granted August 15th, 1905, are described and claimed machines for obtaining desired quantities of material, which machines operate by separating a stream of material into successive series of proportional increments and distributing these increments in order among a number of receptacles until a definite gross quantity of material has thus been operated upon, reference being hereby made to said Letters Patent for a full explanation of said machines and the principles on which they are based. In using these machines, when constructed as shown in the drawings of said Letters Patent, the definite gross quantity of material is obtained by a separate weighing or measuring operation performed prior to the distribution of said quantity, and my present invention, which relates to apparatus of the same general type, is intended to improve upon said prior machines by providing means whereby said gross quantity may be determined by the operation of the apparatus itself, thereby dispensing with a separate weighing or measuring operation and making the action of the apparatus wholly automatic. To this end I provide means for supplying an indefinite stream of material to a series of separators, whereby it is distributed, and I employ a scale upon the platform of which a series of receptacles, equal in number to the individual quantities desired, may be placed collectively, said scale being so constructed and arranged that when the total quantity operated upon by the separators and delivered to these receptacles becomes equal to the sum of said individual quantities, the scale will operate and automatically cut off the delivery of material to said separators and receptacles, thus leaving in each of the latter the desired amount of material. The stream of material which is divided by the separators and distributed into the respective receptacles may be delivered to the separators in any suitable form and manner, but I prefer to give it the form of a circular or annular sheet, for the reasons set forth in Letters Patent No. 797,145, above referred to. I have accordingly shown my present improvements as embodied in a machine in which such a stream of material is delivered to the separators, and certain features of my present invention relate to the construction of the stream-feeding devices, as will be hereinafter set forth.

A preferred form of apparatus embodying my improvements is illustrated in the accompanying drawings, in which—

The general arrangement of the supply bin and separators in my present apparatus may conveniently be similar to that shown and described in the aforesaid Letters Patent No. 797,145 and is so illustrated in the accompanying drawings, in which—

2 represents the frame-work of the apparatus, within the upper portion of which is located a bin 3 formed by an external cylindrical shell 4 and an internal cone 5, said cone and shell being respectively secured to concentric, vertical shafts 6 and 7 which are journaled in the top of the frame-work 2 and are supported and driven as hereinafter described. When the apparatus is in operation the shell 4 is raised sufficiently to provide a narrow annular opening between its lower edge and the lower portion of the cone 5, thus providing for the delivery of a thin, circular sheet stream of material, which falls therefrom into a circular series of separators. In the present case this series of separators is bolted rigidly to the frame-work 2, as at 8, instead of being mounted to rotate as shown in my aforesaid application. These separators are preferably formed, as shown and described in said application, by drilling a series of conical holes in the rim of a wheel-like member 9, the walls of adjacent holes being made to intersect and thereby forming vertically-curved separating edges 10. Each hole forms a pocket 11 from the bottom of which an inclined tube 12 leads downward to an adjustable frame by means of which its lower end is held in proper position over a receptacle. This frame is bolted to the frame-work 2 as at 13 and consists of four side bars 14 forming a hollow square or rectangle, on which bars are supported a number of blocks 15. Each of these blocks is connected with a similar block on the opposite side of the frame by an oblong wire loop 16, the ends of which pass around said blocks and are secured thereto, and the sides of which are parallel and are just far enough apart to receive between them the lower end of a tube 12. The loops 16 which extend between two opposite sides of the frame are located above those which extend between the other two sides, thus forming at their intersections a number of square openings which should be equal in number to the tubes 12 and to the receptacles which are to be filled at one operation of the apparatus. Into each of these openings thus formed is introduced the lower end of one of the tubes 12, the lateral adjustment of said lower ends to correspond with receptacles of different sizes being provided for by forming a longitudinal slot 17 in each of the four sides of the frame and passing a headed bolt 18 through each block 15 and through said slot, so that said blocks may be slid along the sides of the frame into any desired position, in which they may be clamped by means of thumb screws 19 on said bolts.

The construction of the parts above described is or may be substantially the same as that shown in said Letters Patent No. 797,145, in which they are broadly claimed, and to which reference may be made for a more detailed description thereof. My present invention does not relate to these parts, except in so far as they are modified or combined with other parts or features, as hereinafter set forth, and in some of these combinations they are to be regarded as representative or typical of any stream-supplying and separating means operating according to the same broad principles.

In my prior sheet stream apparatus, above referred to, provision is made for revolving both the series of separators and the stream of material, but for reasons which will hereinafter appear it is desirable in my present apparatus that the separators be not rotated, and therefore, in order to obtain a sufficient velocity of rotation of the stream of material with respect to the separators, I rotate both the cone 5 and shell 4 in the same direction instead of in opposite directions. To this end the shafts 6 and 7 are respectively provided with gears 20 and 21 which mesh with supplementary gears 22 and 23 secured to a vertical shaft 24 which is journaled on the frame-work of the machine and driven in any suitable manner, as by means of bevel gears 25 and 26, of which the latter is secured to a shaft 27 provided with a belt wheel 28. Since the gears 20, 21, 22 and 23 are mounted on parallel axes, the shell 4 (or the cone 5) with its shaft and gear may be made vertically movable without making it necessary to spline said gear to its shaft in order to prevent the disengagement of its teeth from its driving gear. Each of the shafts 6 and 7 is preferably supported upon a ball bearing, which may consist of superimposed collars 29 and 30 having their adjacent faces grooved to receive the balls 31, the lower collar 29 being secured to the frame-work of the machine and the upper collar 30 being secured to the shaft.

In order to feed a continuous stream of material to the bin formed by the cone 5 and the shell 4, I provide an annular trough 32 secured to one of the members which form said bin, in the present case to the shell 4. From the trough 32 one or more pipes 33, open at both ends, lead to the bin, and a pipe 34, to which material is supplied continuously in any desired manner, is secured to the frame-work 2 and has its lower end located within the trough 32. As thus constructed, when the shell is stationary the material falls through the pipe 34 until its lower end is choked up by the accumulation of material in said trough and the flow through said pipe is thereby stopped, but when and as long as said shell is rotated, its lower end pushes the accumulated material before it and thus feeds it through the pipes 33 into the bin 3. A number of pipes 33 are preferably provided, in order both to deliver material to all parts of the bin and thus keep the depth of its contents uniform, and also to prevent such an accumulation of material in front of the pipe 34 as to cause it to overflow the side walls of the trough when the shell is rotated.

I prefer to make the gears 20 and 22 of slightly different diameter from the gears 21 and 23 respectively, so as to rotate the cone 5 and the shell 4 at different speeds, in order that the delivery of material to the separators may be facilitated by the relative movement of the walls of the bin 3, and I also prefer that these speeds of rotation shall be as nearly incommensurate as possible, in order to reduce the liability to systematic errors, as explained in Letters Patent No. 797,144, above referred to.

Figure 1:
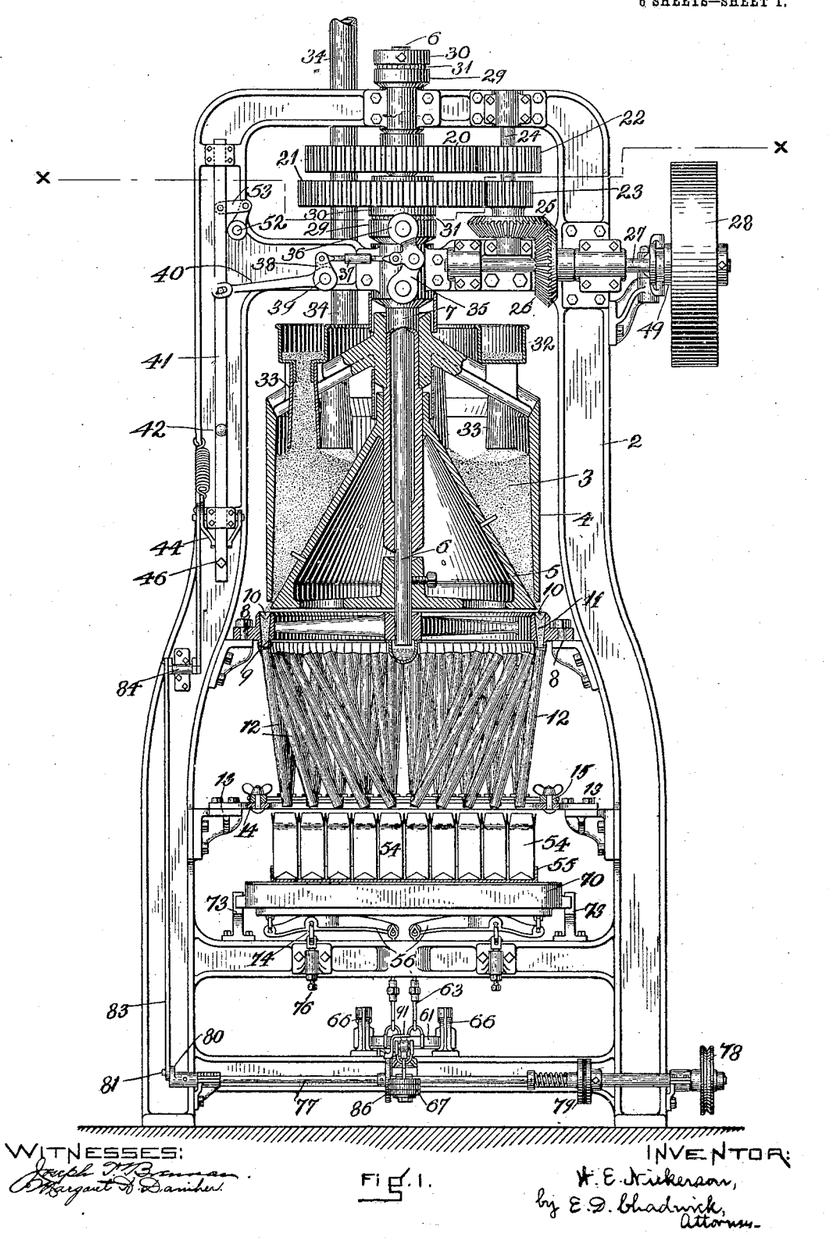
Figure 1 is a side view, partly in elevation and partly in central vertical section, of the complete apparatus.
Figure 2:
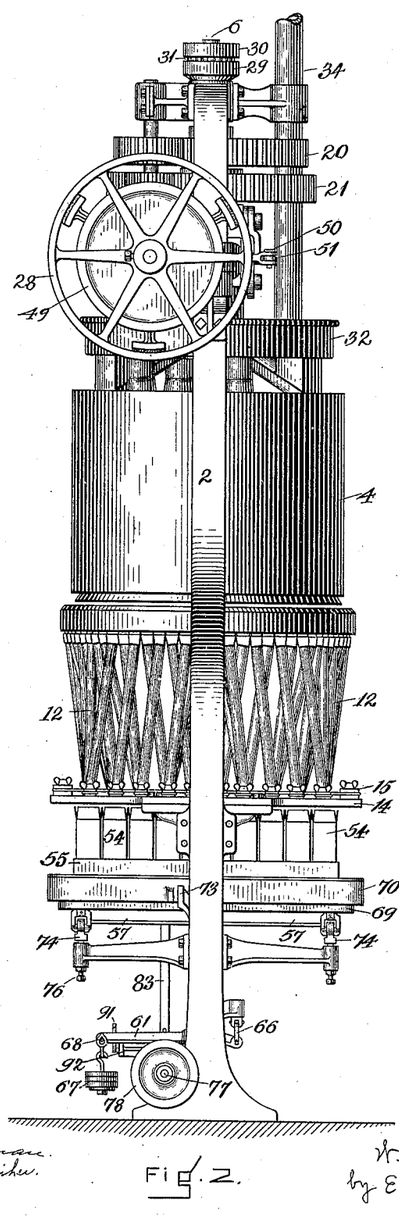
Fig. 2 is an end elevation of the same, looking from the right hand side of Fig. 1.

The vertically movable member of the supply bin, in this case the shell 4, is provided with means whereby it may be raised and lowered to permit and cut off the flow of material to the separators, which means may consist of two pairs of links 35 and 36 pivoted respectively to the bearing in which the shaft 7 is journaled and to the collar 29 which supports said shaft through its ball bearing above described, said links being also pivoted to each other, thus forming a species of toggle. These two pairs of links are located on opposite sides of the shaft 7, and one of the links of each pair, as the link 36, is connected by a rod 37, the length of which should be adjustable, to an arm 38 secured to a rock-shaft 39 journaled on the frame-work of the machine. Said rock-shaft is operated by means such as an arm 40 secured thereto and pivotally connected at its outer end to a sliding rod 41, which is guided to move vertically and has an operating handle 42 secured to it. As thus constructed, when the rod 41 is moved downward by the handle 42 the links 35 and 36 will be drawn toward the left, as represented in Fig. 1, thus lengthening the toggles which they form and forcing the shaft 7 and shell 4 upward, and when said rod 41 is released the weight of the shell 4 and its shaft will cause them to drop, thereby forcing the links 35 and 36 to the right and raising the rod 41.

In order to hold the shell 4 at the proper height to provide a suitable delivery aperture at its lower edge, the rod 41 is provided with a catch 43 arranged to be engaged and detachably held by a spring-operated latch 44 pivoted to the frame-work 2. As shown, this catch consists of a block bolted to the lower end of the rod 41 and having several holes 45 tapped in it for the reception of the bolt 46, in order to provide for holding the shell 4 in different positions corresponding to different widths of the delivery aperture at the bottom of the bin 3. The block 43 is prevented from turning on its bolt 46 by providing it with a rib 47 held in a groove 48 formed longitudinally in the lower end of the rod 41. The shell 4 may thus be held in its raised position until the latch 44 is tripped, and when thus released it will immediately fall by its own weight and close the delivery aperture above the separators.

It is desirable to stop the rotation of the shell 4 and cone 5 simultaneously with the closing of the aperture at their bottom edges, not only to prevent the grinding of these parts against each other at said edges when they are rotated at different speeds, but also to stop the delivery of material through the pipe 34, and to this end I prefer to mount the belt wheel 28 loosely on the shaft 27 and to connect it thereto by a friction clutch 49 splined on said shaft, said clutch being operated by means such as a pivoted lever 50 connected by a link 51 to one end of a rock-shaft 52, the other end of which is connected by a link 53 to the sliding rod 41. These parts are so arranged that when said rod 41 is moved downward the clutch 49 will be thrown into engagement with the belt wheel 28 simultaneously with the raising of the shell 4, and when the latch 44 is tripped the weight of the shell 4 will cause the latter to drop and close the delivery aperture at its bottom, and also, through its connection with the rod 41, to throw the clutch 49 out of engagement with the belt wheel, whereupon both the cone and the shell will immediately come to rest.

The receptacles 54 which are to be filled simultaneously are preferably introduced in a tray 55. This tray is supported on the platform of a scale, which in an apparatus of this size is preferably compound and may consist of two beams 56 each forked at one end to provide two arms 57, each of which is mounted on a knife edge 58 and provided with a knife edge 59 on which the corner of the platform of the scale is supported. The other ends of said beams 56 carry knife edges 60 supporting suitable connections from which are suspended a third scale beam 61. These connections, as shown, consist of two pairs of connected eyes 62, from which are suspended two rods 63, adjustable as to their length and hooked at their lower ends into the connecting portions of eyes 64 similar to the eyes 62, in which eyes 64 rest the knife edges on which the scale beam 61 is suspended. One end of the latter beam has knife edges 65 secured to it, which bear against a fixed abutment 66, and its other end carries the weighing weight 67, suspended from knife edges 68. The platform of the scale is preferably made double, the lower portion 69 being supported on the knife edges 59 and the upper portion 70 being supported on the lower portion by means of balls 71, one at each corner, which balls rest in concave recesses 72 formed in the upper and lower portions of the platform. This construction is old in the art and is employed for the purpose of permitting a slight lateral movement of the load without danger of its affecting the scale beams. These movements of the upper portion of the platform may be limited by suitable stops secured to the frame-work 2, as shown in Fig. 1.

Figure 10:
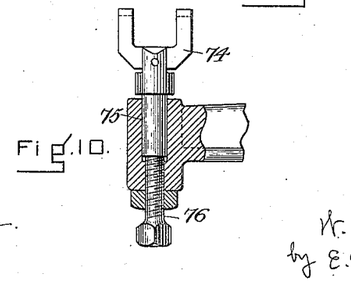
Fig. 10 is a sectional detail of a knife-edge support forming part of the weighing mechanism.

The grooved supports 74 which receive the knife edges 58 are preferably constructed as shown in detail in Fig. 10, being mounted to turn freely in a vertical socket 75 and adjustably supported on a bolt or screw 76, whereby they are rendered self-alining and a firm and level bearing for the four corners of the scale platform is secured. This construction of these supports 76 is not original with me, however.

Figures 3, 4, 5, 6:
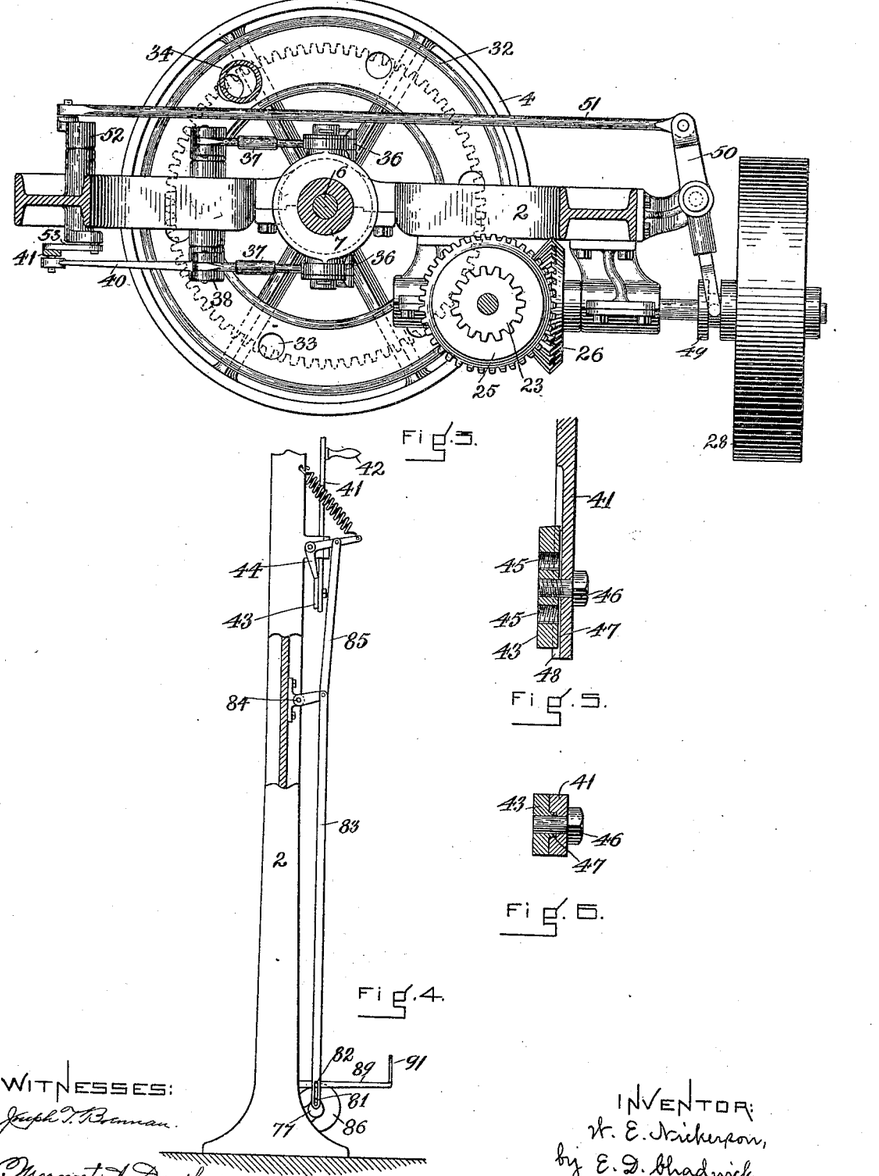
Fig. 3 is a horizontal section on the line $x$—$x$ in Fig. 1, showing also in dotted lines a gear which is above the line of section.
Fig. 4 is a detail side elevation showing a tripping mechanism hereinafter described.
Fig. 5 shows in central, vertical section a sliding rod and an adjustable block secured thereto, forming a part of said tripping mechanism.
Fig. 6 is a transverse section of the same parts.
Figure 7:
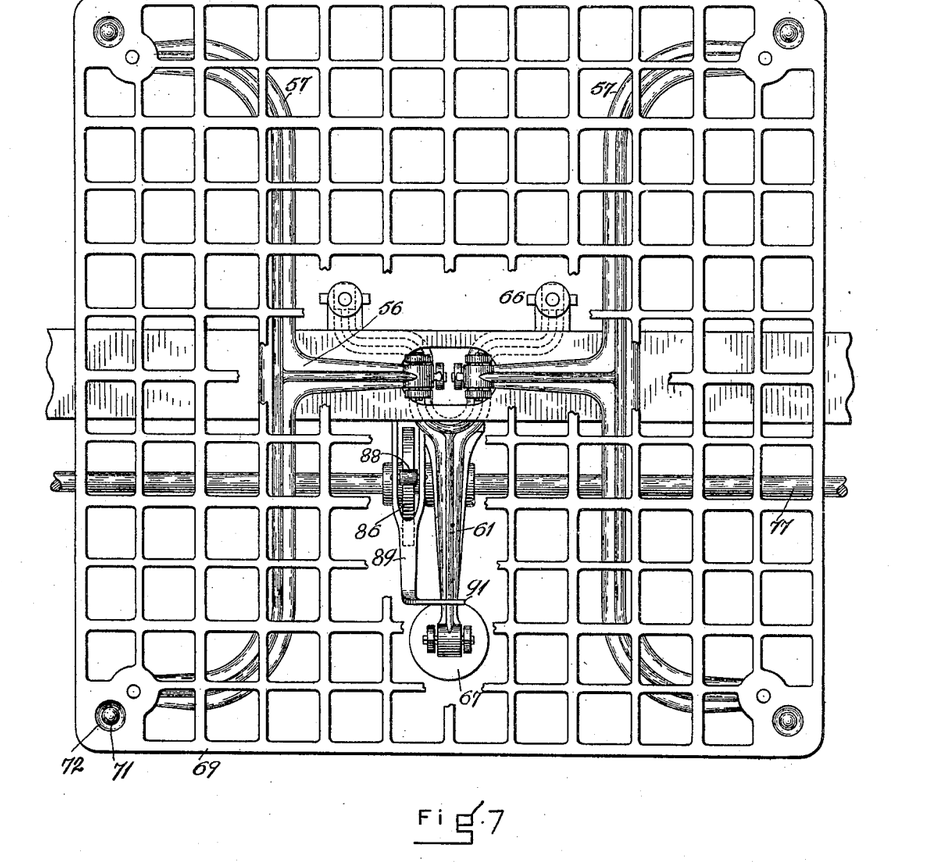
Fig. 7 is a plan view of the lower portion of the scale platform and the parts beneath it.
Figure 8:
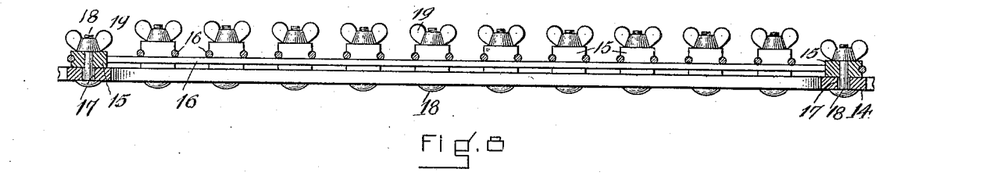
Fig. 8 is a vertical section through an adjustable frame located above the receptacles, the section being taken on a plane parallel with that of the framework of the apparatus.
Figure 9:
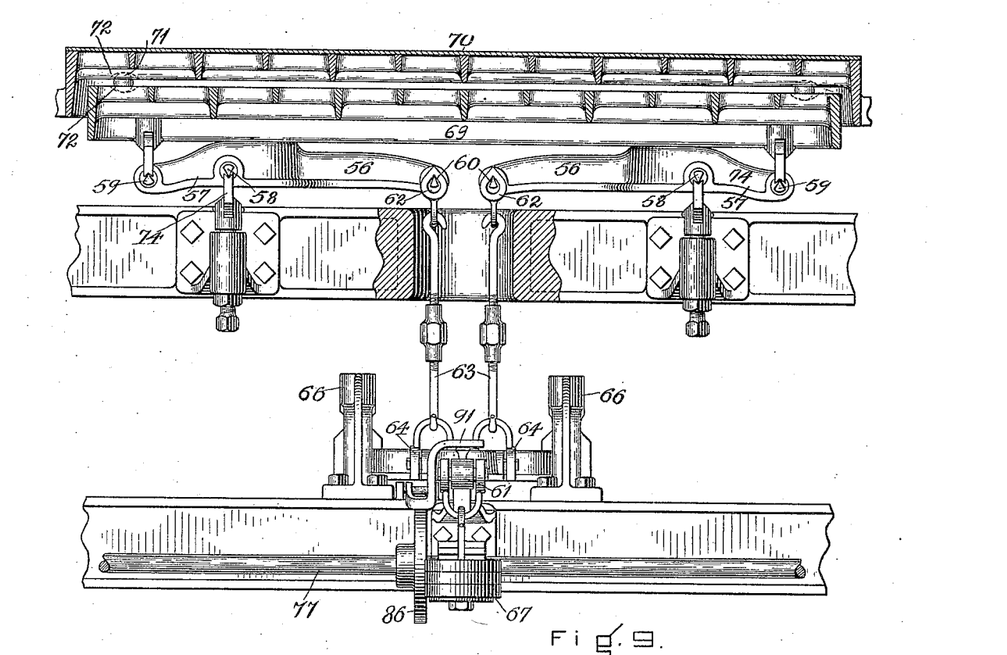
Fig. 9 is a similar section through the weighing mechanism, taken on the same plane.
Figure 11:
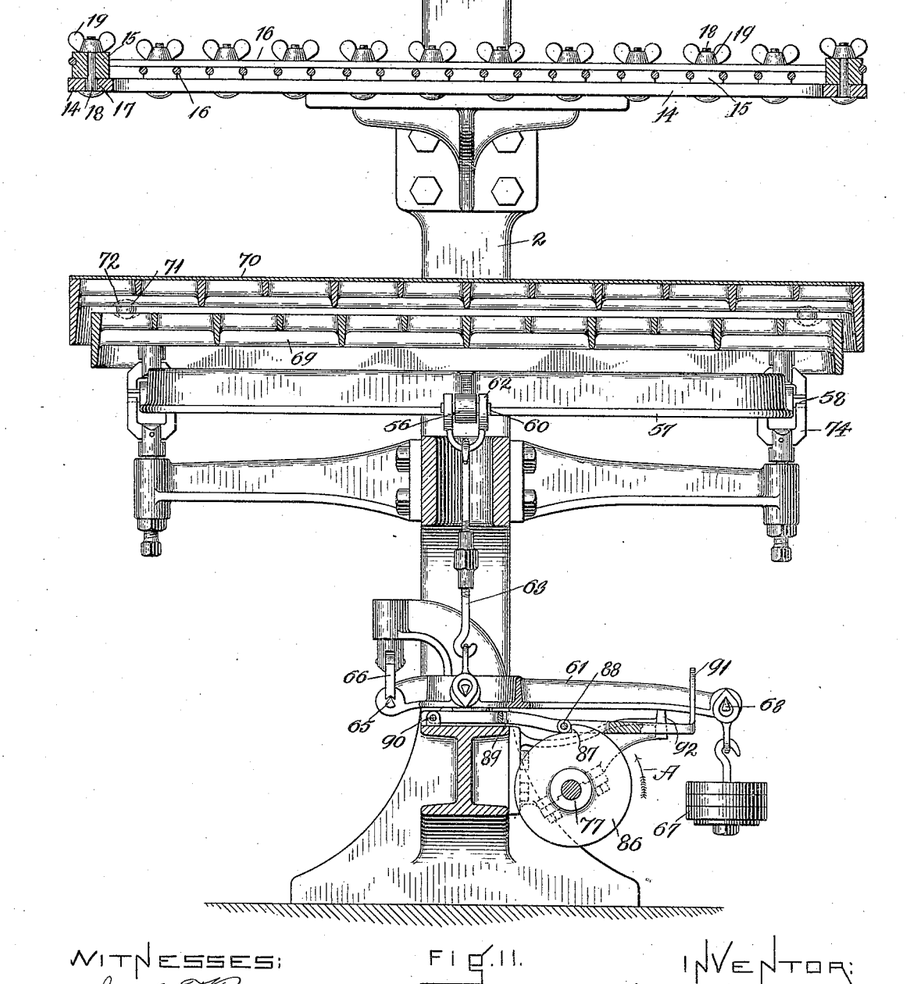
Fig. 11 is a vertical section through the frame above referred to and through the weighing mechanism, taken at right angles to the plane of Figs. 8 and 9.

The weighing weight 67 is so adjusted that when the total amount of material delivered to the receptacles 54 is equal to the sum of the quantities which the respective receptacles are intended to receive, the scale beams will tilt, and this action of the scale is made to effect the closing of the delivery aperture at the bottom of the bin 3 by tripping the pivoted latch 44 and thus permitting the shell 4 to drop as previously described. For tripping said latch 44 I prefer to employ a horizontal shaft 77 journaled near the base of the machine and provided with a belt wheel 78 mounted loosely thereon and continuously driven in the direction indicated by the arrow A in Fig. 11, said wheel 78 being normally connected with the shaft by a friction clutch 79, the tension of which is such that the shaft 77 will rotate continuously with the belt wheel 78 except when such rotation of the shaft is positively arrested, at which times the engaging members of the clutch will slip. One end of the shaft 77 is provided with a crank arm 80 the crank-pin 81 of which passes through a slot 82 formed in the lower end of a link 83, which link is operatively connected with the pivoted latch 44, in the present machine through a rock-shaft 84 and a supplementary link 85. On the shaft 77 is rigidly secured a stop cam 86, the stop face 87 of which is adapted to be engaged by a roller 88 carried by an arm 89. One end of this arm 89 is pivoted to the frame-work 2, as at 90, and its other end 91 is bent upward and over the free end of the scale beam 61 in such manner that when said beam tilts, upon the completion of the total load on the scale platform, its free end will engage the end 91 of the arm 80 and thereby lift the roller 88 and release the stop cam 86, whereupon the shaft 77 will instantly be rotated, and will continue to rotate until the weighted end of the scale beam 61 is permitted to drop back upon a support 92 by the removal of the filled receptacles from the scale platform. When said scale beam thus falls to its normal position the roller 88 will also drop onto the cam 86 and will follow the contour thereof until it is engaged by the stop-face 87 and the rotation of the shaft 77 is thereby arrested. Said cam 86 is so adjusted on the shaft 77 that when its face 87 engages the roller 88 the crank pin 81 will be in its uppermost position, as shown in Fig. 4, and the slot 82 in the link 83 is so located that when the latch 44 is in engagement with the block 43 the bottom of said slot will be just beneath the pin 81 when the latter is in the position shown in Fig. 4, so that when the scale operates as above described and releases the shaft 77, the latch 44 will immediately be tripped by the rotation of said shaft and the engagement of its crank pin 81 with the link 83. The purpose of the slot 82 is to permit the engaging movement of the latch 44, regardless of the position of the crank pin 81. After the latch 44 has been tripped it will be immaterial whether the shaft 77 continues to rotate or not, since no further delivery of material to the separators can occur until the rod 41 has been drawn downward and its block 43 has been engaged by said latch.

In operating the apparatus, as soon as a tray full of receptacles has been filled the delivery of material to the separators is immediately stopped automatically as above described, the filled receptacles are removed and another tray full of empty ones is substituted therefor, and the shell 4 is then raised by hand and locked in its raised position by the engagement of the block 43 with the latch 44, whereupon another operation of the apparatus is performed, the only attendance which it requires being that involved in the removal of the filled receptacles and the introduction of a supply of empty ones, and in the starting of the apparatus by raising the shell 4. It will be noted that it is not necessary for the scale to be especially sensitive, since any error caused by lack of sensitiveness in any one operation of the apparatus will be divided among all the individual quantities produced by that operation, in proportion to their respective sizes.

It is to be understood that my broad invention is not limited to the delivery of any particular kind of stream to the separators, nor to the arrangement shown for delivering it in a sheet stream, in case such a stream is employed. Nor is my invention limited to any particular construction of separators nor to any specific form of scale or weighing apparatus, the construction herein shown being merely the preferred form of my apparatus. So too the connections between the scale and the stream-controlling devices may be varied at will, since, so far as I am aware, I am the first to weigh a plurality of packages at once upon a single scale, as well as the first to combine means for separating a quantity of material into proportionate parts, according to the principles set forth in the Letters Patent previously referred to, with means, such as a weighing mechanism, whereby the gross quantity of material thus separated is automatically determined and the flow of material stopped, the weighing mechanism thus being relied upon to obtain a definite gross quantity of material and the action of the separators being relied upon to distribute said definite quantity into the proportional parts desired. Some of the subordinate features of my invention, however, relate to the construction of the mechanism above referred to, as specified in the subjoined claims.

I claim as my invention:

1. In an apparatus of the character described, the combination of a weighing mechanism adapted to receive a number of independent, removable receptacles simultaneously, means for delivering material to said receptacles concurrently, means for maintaining the rates of delivery of said delivering means at a constant proportion with respect to one another, and means operative with the weighing mechanism for cutting off the delivery of material to said receptacles.

2. In an apparatus of the character described, the combination of a series of separators, means for delivering a stream of material thereto, means for producing a relative movement between said stream and the separators, lengthwise of the series and means for automatically cutting off the delivery of material to said separators when the required gross quantity of material has been separated thereby.

3. In an apparatus of the character described, the combination of a series of separators, means for delivering a stream of material thereto, means for producing a relative lateral movement between said stream and the series of separators, a scale adapted to receive a number of receptacles simultaneously, means for conducting material from the separators to said receptacles, and means caused to operate by the tilting of the scale for cutting off the delivery of material to the separators.

4. In an apparatus of the character described, the combination of a stationary series of separators, means for delivering a stream of material thereto, means for moving said stream across said separators, a scale adapted to receive a number of receptacles simultaneously, means for conducting material from the separators to said receptacles, and means caused to operate by the tilting of the scale for cutting off said stream.

5. In an apparatus of the character described, the combination with a stationary series of separators, of a bin the walls of which are laterally movable with respect to said separators, a trough movable with said bin and communicating therewith, and means for delivering material to said trough continuously during its movement.

6. In an apparatus of the character described, the combination of a bin journaled on a vertical axis, means for rotating the same on said axis, an annular trough concentric with said axis and carried by said bin, passages leading from the trough to the bin, and a supply pipe having its open lower end located in said trough.

7. In an apparatus of the character described, the combination of an annular bin the inner and outer walls of which are independently rotatable about a central axis, means for rotating said walls, an annular trough concentric with said axis and carried by one of the walls of the bin, passages leading from the trough to the bin, and means for delivering material to said trough.

8. In an apparatus of the character described, the combination of a bin and means for rotating the walls of the same, means for delivering material to the bin during such rotation, a stationary series of separators, a scale arranged to receive a number of receptacles simultaneously, means for conducting material from the separators to the respective receptacles, and means operative with the tilting of the scale for cutting off the delivery of material from said bin.

9. In an apparatus of the character described, the combination of a series of separators, a cone and a shell independently journaled on concentric, vertical axes, means for rotating said cone and shell at different speeds, means for raising said shell and thereby providing a delivery aperture at its lower edge, a scale adapted to receive a number of receptacles simultaneously, means for conducting the material from the separators to said receptacles respectively, and means operative with the tilting of the scale for simultaneously cutting off said stream of material and stopping the lateral movement thereof.

10. In an apparatus of the character described, the combination of a bin the walls of which are independently and concentrically journaled on vertical axes, one of said walls being vertically movable and adapted to fall by its own weight, means for rotating said walls with respect to each other, and means for stopping such rotation which are actuated by the weight of said vertically movable wall when it falls.

11. In an apparatus of the character described, the combination of a bin the walls of which are independently and concentrically journaled upon vertical axes, a shaft, means driven by said shaft for producing a relative rotation between said walls, and means for raising and lowering one of said walls and simultaneously connecting and disconnecting said shaft and a source of power.

12. In an apparatus of the character described, the combination of a rotatable bin having one of its walls vertically movable to provide a delivery aperture at its lower edge and adapted to fall by its own weight, means for rotating said bin, means for raising its vertically movable wall and a latch for holding it in its raised position, a stationary series of separators, a scale adapted to receive a number of receptacles simultaneously, means for conducting material from the separators to the respective receptacles, and means caused to operate by the tilting of the scale for tripping said latch.

13. In an apparatus of the character described, the combination with a series of separators, a scale, and means for conducting material from the separators to said scale, of a bin the walls of which are independently and concentrically journaled upon vertical axes, a shaft and means operated thereby for rotating said walls, means for raising one of said walls and thereby providing a delivery aperture at its lower edge, a clutch arranged to connect the shaft with a source of power, connections between said vertically movable wall and said clutch, adapted to be operated by the weight of the former, a latch for holding said wall in its raised position, and means caused to operate by the tilting of the scale for tripping said latch.

14. In an apparatus of the character described, the combination of a shell and a cone secured respectively to concentric, vertical shafts, a driving shaft having a belt wheel loosely mounted thereon, driving connections between said shafts, means for raising and lowering said shell, a clutch on the driving shaft adapted to lock the driving wheel thereto, and positive connections between said clutch and the mechanism for raising and lowering the shell.

15. In an apparatus of the character described, the combination of a cone and a shell forming a bin between them and independently and concentrically journaled on vertical axes, means for rotating said cone and shell, comprising gears 20 and 21 located above said bin and meshing with gears 22 and 23 mounted on a shaft parallel with said axes, means for driving said shaft, and means for raising and lowering said shell.

16. In an apparatus of the character described, the combination of a scale, means for delivering material thereto, a latch controlling said delivery, and means operative with the tilting of the scale-beam for tripping said latch, comprising a shaft, a continuously rotated driving wheel loosely journaled thereon and normally connected thereto by a friction clutch, latch-tripping connections between said shaft and latch, a stop for arresting the shaft, and means arranged to be actuated by the tilting of the scale beam for releasing said shaft.

17. In an automatic weighing apparatus, the combination of a series of receptacles, each adapted to receive and retain during the weighing operation the material delivered thereto, a weighing device arranged to weigh at one operation the total quantity of material in the series of receptacles, and means for delivering material to said receptacles, comprising a cut-off controlled by the weighing device.

In testimony whereof, I have hereunto subscribed my name this twenty-third day of November, 1901.

WILLIAM EMERY NICKERSON.

Witnesses:
E. D. CHADWICK,
JOSEPH T. BRENNAN.